United States Patent [19]
Kwon

[11] Patent Number: 5,400,059
[45] Date of Patent: Mar. 21, 1995

[54] HIGH SPEED THERMAL PRINTER

[75] Inventor: Sang-chul Kwon, Suwon, Rep. of Korea

[73] Assignee: Samsung Electronics Co., Ltd., Kyungki, Rep. of Korea

[21] Appl. No.: 72,910

[22] Filed: Jun. 9, 1993

[30] Foreign Application Priority Data

Jul. 20, 1992 [KR] Rep. of Korea .................... 92-12880

[51] Int. Cl.$^6$ .................... B41J 2/325; B41J 11/42; B41J 11/36
[52] U.S. Cl. .................... 347/184; 346/134; 346/136; 400/120
[58] Field of Search ............ 346/76 PH, 134, 136; 400/120

[56] References Cited

U.S. PATENT DOCUMENTS 4,990,930  2/1991  Ludden et al. ................ 346/76 PH
5,257,098  10/1993  Lee ................ 346/76 PH

FOREIGN PATENT DOCUMENTS 0112960  4/1990  Japan .

*Primary Examiner*—Huan H. Tran
*Attorney, Agent, or Firm*—Sughrue, Mion, Zinn, Macpeak & Seas

[57] ABSTRACT

A high speed thermal printer including a maximum data detector for detecting maximum gradation data from the image signal of a line received from a signal input source on a line-by-line basis, a drum motor for transporting printing paper, a reel motor for transporting film containing printing dye, and a servo controller for controlling a printing speed by varying the speed of the drum motor and the reel motor in accordance with the detected maximum data value. The printer has the advantages of the drum motor and reel motor being driven at a constant speed for the duration of the maximum gradation printing, and the dye being expressed uniformly throughout the printing line. Thus, high quality printing can be achieved and the printing time decreased by the motors being driven at a constant speed to the following printing position after the maximum gradation of a line has been printed.

6 Claims, 4 Drawing Sheets

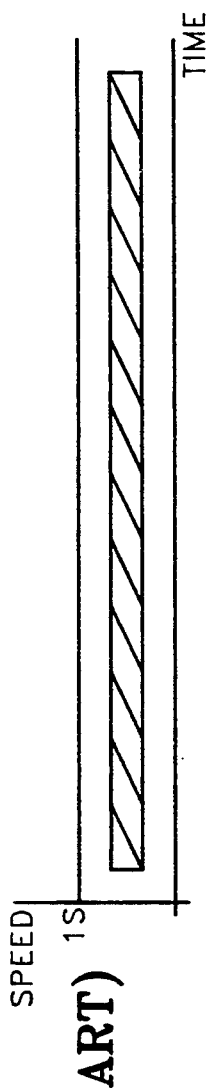
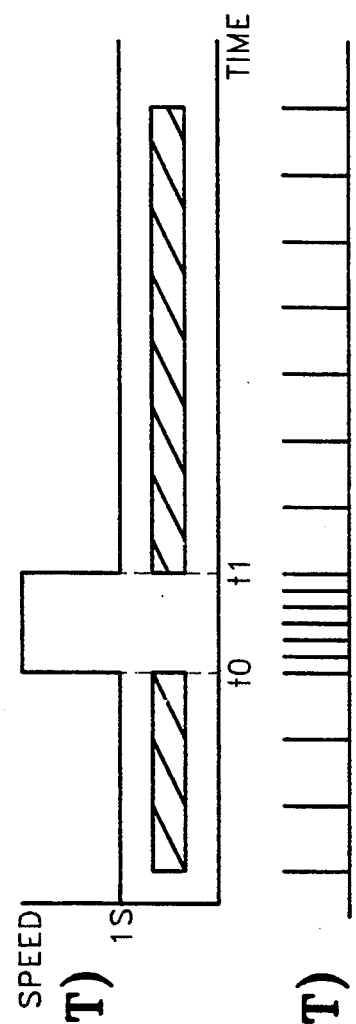
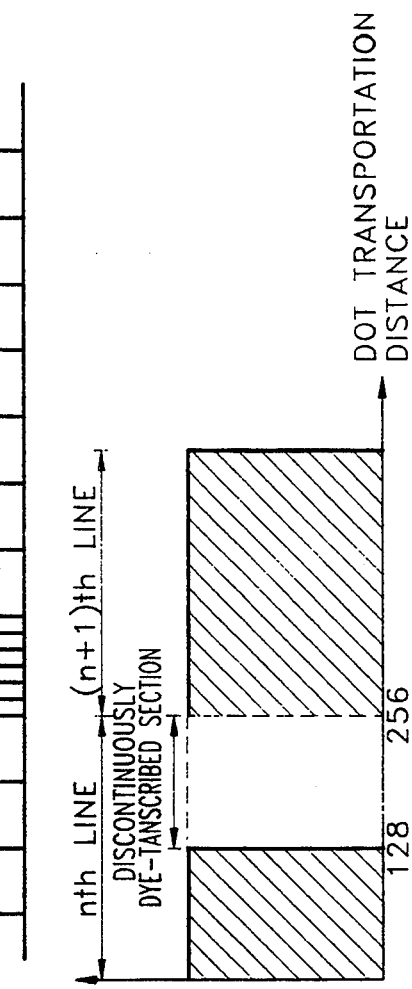
FIG. 1 (PRIOR ART)
FIG. 2 (PRIOR ART)
FIG. 3 (PRIOR ART)
FIG. 4 (PRIOR ART)
FIG. 5 (PRIOR ART)

HIGH SPEED THERMAL PRINTER

BACKGROUND OF THE INVENTION

The present invention relates to a high speed thermal printer for printing by varying the printing speed in accordance with maximum gradation data on a line-by-line basis.

In general, a thermal video printer prints characters or graphics images on a printing paper by sublimating dye contained in a film with energy supplied to a thermal print head, wherein the greater the thermal energy delivered to the paper, the higher the printing density. Such a sublimating thermal video printer is typically capable of printing in 256 gradation levels for each of the primary colors Y (yellow), M (magenta), C (cyan) for each pixel.

Among the conventional thermal video printers, a video printer is disclosed in U.S. Pat. No. 4,990,930 which detects a maximum value from the image data of a line, drives a stepping motor at a constant speed until the maximum value has been printed, and then drives the motor at a predetermined speed to the start position of the next printing line. This apparatus will be explained hereinbelow with reference to FIGS. 1 through 5.

FIGS. 1 and 2 show the relationship between the motor speed (a constant speed) in a normal condition and a driving pulse driving the motor. That is, if 8-bit image data is used to express gradation levels 1 through 256 (256 being the maximum), a motor is driven at a constant speed for the duration of printing the gradation levels of 1 through 256.

Referring to FIGS. 3 and 4, if the detected maximum data value corresponds to gradation level 128, the motor is driven at a constant speed until the gradation level 128 has been expressed, and in an acceleration frown time $t_0$ representing the finishing of printing one line to time $t_1$ representing the start of printing the following line, which results in the discontinuously dye-transcribed section as shown in FIG. 5.

That is, printing at the maximum gradation level 256 causes no problem in practice because the dye is uniformly spread throughout the entire printing time. However, for example, printing at the gradation level 128 requires the dye to be expressed only for the duration of the first half of the printing time (corresponding to one-line printing). As a result, linear stripes are generated in the main scanning direction (vertically along the direction of movement of the thermal print head) throughout the image, which degrades the image.

Moreover, this video printer has a further drawback of requiring a long printing time. The printer performs printing at a constant speed until the detected value of maximum gradation has been printed, as a result of which even for accelerated transporting of the printer head to the start of the next printing line after a preceding line of the image has been printed, a certain amount of time is necessary for the printer head's movement.

In addition, a printing time control method for shortening the printing time in video printers is disclosed in the Japanese Laid-Open Patent Publication Hei. 2-112960. In accordance with this method, whether or not the data has been applied to the thermal print head for each gradation is detected, and the printing operation is finished when the gradation data becomes null. However, such a video printer also requires significant time to transport the printer head to the start of the next printing line after printing a preceding line.

SUMMARY OF THE INVENTION

To overcome the above mentioned problems, an object of the present invention is to provide a high speed thermal printer which results in uniform expression of the dye throughout the entire line, wherein the dye is expressed by detecting the maximum printing gradation and varying the printing speed in accordance with the detected maximum gradation value while printing up to the maximum gradation.

Another object of the present invention is to provide a high speed thermal printer having a shortened printing time by detecting the maximum gradation value in a line and driving the print head at a constant speed according to the detected value, whereby the printing paper is positioned at the printing position of a next line after one line has been printed.

To realize the above objects, the present invention provides a high speed thermal printer for receiving and storing image data from a signal input source on a line-by-line basis, gradation-comparing the stored image data with a predetermined gradation value, and then printing on printing paper by sublimating the dye by means of a thermal print head composed of heat emitting bodies, the printer comprising detecting means for detecting maximum gradation data from the image data of a line received from the signal input source on a line-by-line basis, servo means for transporting the printing paper and film having the dye thereon, and servo controlling means for controlling a printing speed by varying the speed of the servo means in accordance with the data value detected by the detecting means.

BRIEF DESCRIPTION OF THE DRAWINGS

These and other objects, features, aspects and advantages of the present invention will become more apparent from the following detailed description of the present invention when taken in conjunction with the accompanying drawings, in which:

FIGS. 1 to 4 are waveform diagrams for high speed driving of the conventional thermal printer;

FIG. 5 shows a printing style in the conventional case of 128 gradations;

DESCRIPTION OF THE PREFERRED EMBODIMENTS

Hereinafter, a preferred embodiment of a high speed thermal printer constructed according to the present invention will be described with reference to the attached drawings.

Figure 6:
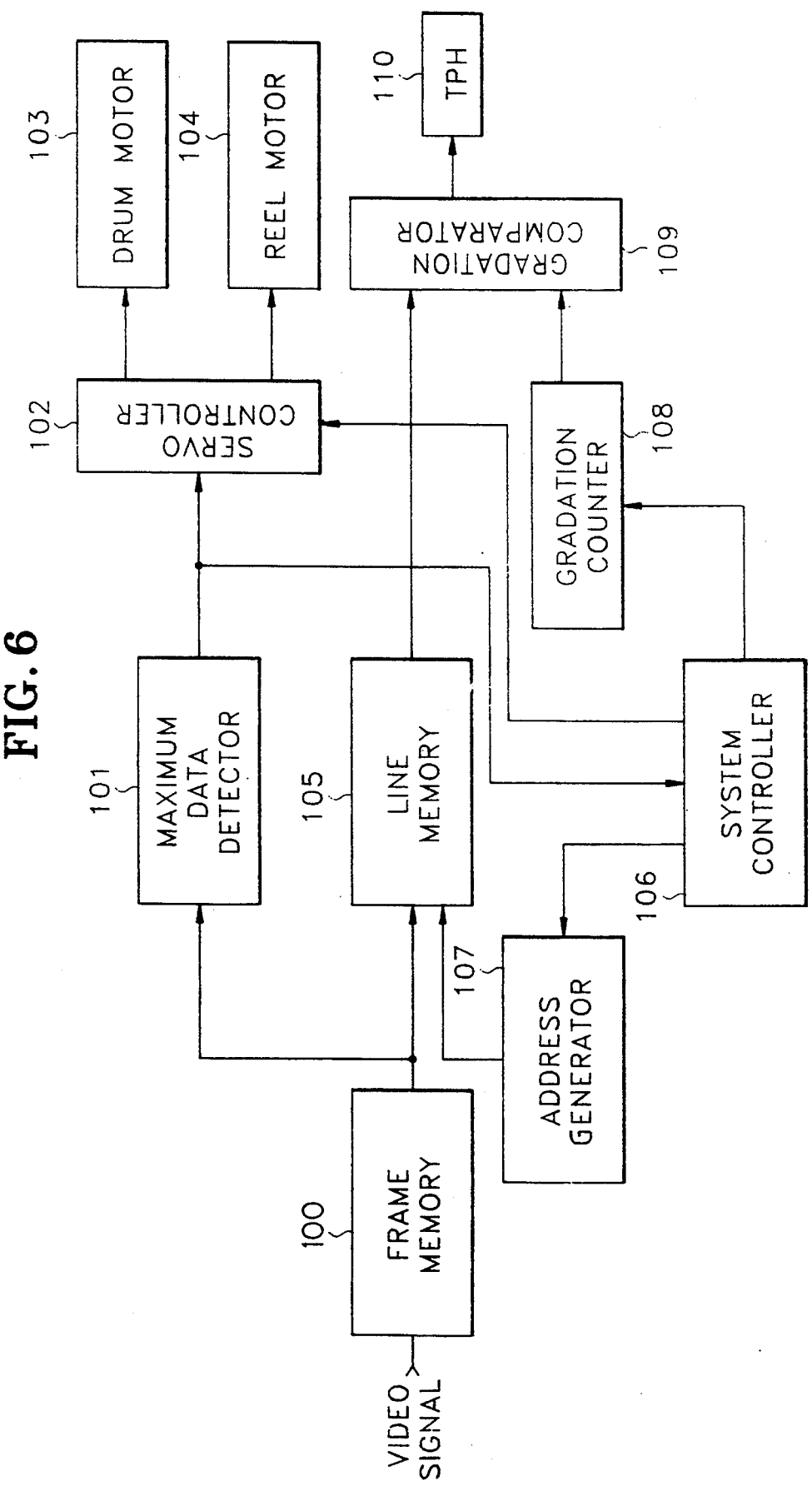
FIG. 6 is a block diagram showing an embodiment of a high speed thermal printer constructed in accordance with the present invention.

FIG. 6 is a block diagram showing an embodiment of a high speed thermal printer according to the present invention. The high speed thermal printer includes a frame memory 100 for storing therein a signal processed from an inputted received image signal, a maximum data detector 101 for detecting the maximum data from the image data read from frame memory 100 on a lineby-line basis, a drum motor 103 for rotating the drum transporting the printing paper, a reel motor 104 for transporting a dye film, a servo controller 102 for driving drum motor 103 and reel motor 104 in accordance with the output of maximum data detector 101, a line memory 105 for storing therein data read from the frame memory 100 on a line-by-line basis, a system controller 106 for generally controlling the overall system by recognizing the output of maximum data detector 101 and in response outputting a speed control signal controlling drum motor 103 and reel motor 104 to the servo controller 102, an address generator 107 for generating write/read address data of line memory 105 under the control of system controller 106, a gradation counter 108 for outputting gradation data having predetermined levels under the control of system controller 106, a gradation comparator 109 for comparing the image data read frown line memory 105 with gradation data output from gradation counter 108, and a thermal print head (hereinafter referred as a TPH) 110 for printing patterns instructed by data having been gradation-compared in gradation comparator 109 by means of heat-generating elements.

The operation in the preferred embodiment according to FIG. 6 will be hereinafter described in detail with reference to the attached drawings.

Referring to FIG. 6, the image signal input to frame memory 100 from the signal input source is stored in digital form on a frame-by-frame basis. Here, for a signal input source such as a camera or television, the input image signal is converted into a digital signal and stored in frame memory 100 as an RGB signal. For such signal input sources such as a personal or graphic computer system, the image data of the digital RGB signal is transferred via protocol methods, e.g., CENTRONICS, GP-IB, SCSI, etc., and stored in frame memory 100. Though not illustrated in the drawings, the printer apparatus according to the present invention also includes an image signal processing circuit for processing the image signal from the signal input source into the RGB signal before the signal is stored in frame memory 100, and an image display circuit for displaying the output of frame memory 100 or the input image signal.

In line memory 105, the data read from frame memory 100 is stored on a line-by-line basis at write addresses specified by address generator 107 in accordance with a write enable signal output from system controller 106.

Then, the data stored in line memory 105 is input to gradation comparator 109 under the control of system controller 106, whereupon gradation comparator 109 gradation-compares the data with the gradation value of gradation counter 108 and transfers the value "1" to thermal print head 110 if the image data read from line memory 105 is greater than the gradation data of gradation counter 108, or the value "0" if not, thereby executing the printing operation.

At this point, drum motor 103 and reel motor 104 are driven to synchronize the output value of gradation comparator 109 with the printing time of thermal print head 110, so that the film and printing paper are completely transported to the next printing line position when the maximum value of one line has been printed.

Hereinafter, the above operation will be described in more detail.

Maximum data detector 101 detects the maximum data from the line data read from frame memory 100, latches the maximum data, and transmits the output to system controller 106.

System controller 106 outputs the speed and direction control signals in the form of a pulse-width-modulated signal to servo controller 102 in order to vary the printing speed in accordance with the maximum printing gradation data (hereinafter referred to as "maximum data") detected by maximum data detector 101.

Servo controller 102 drives drum motor 103 for driving the drum and reel motor 104 for transporting the film (or ink ribbon). Here, servo controller 102 performs the role of transporting the film and driving the drum for transporting the printing paper.

Figure 7:
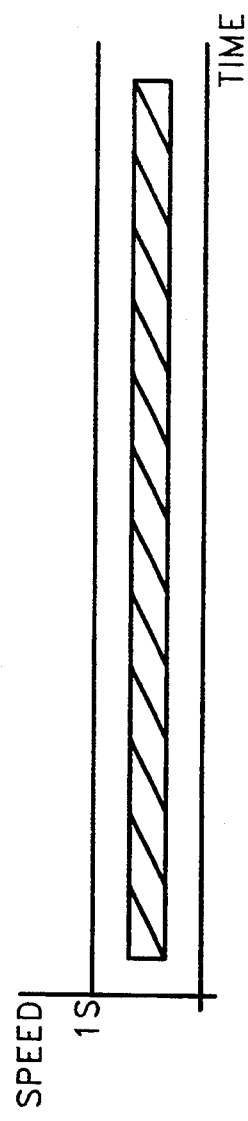
FIGS. 7 to 12 are waveform diagrams showing high speed driving of the high speed thermal printer shown in FIG. 6.
Figure 8:

Accordingly, since, after a line has been printed, the printing paper and film should be transported to the next printing position of the following line simultaneously, drum motor 103 for driving the printing paper and reel motor 104 for transporting the film should be simultaneously controlled. For example, if the data value having been detected from the maximum data detector 101 is "11111111," the maximum gradation level is 256. Therefore, servo controller 102 should generate a motor driving pulse signal for drum motor 103 and reel motor 104 to drive them at a normal speed (1S) and adapted to print one line, as shown in FIGS. 7 and 8. If, on the other hand, the maximum gradation value is "10000000" corresponding to a maximum gradation level of 128, the motor is driven by the pulse signal at twice times (2S) the normal speed.

Figure 9:
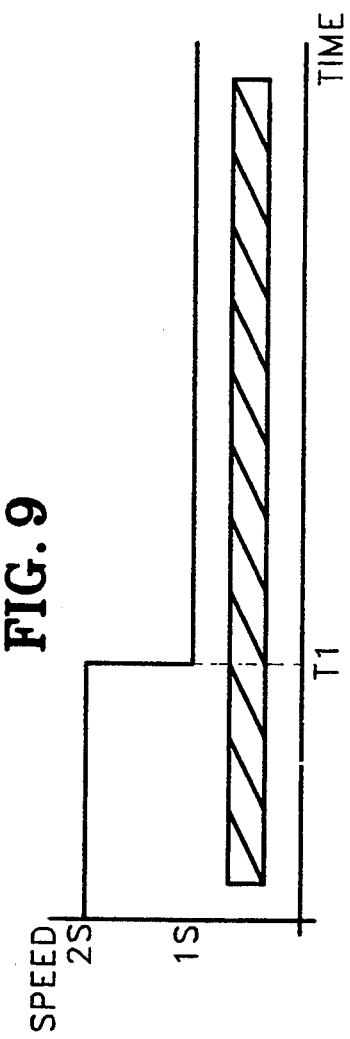
Figure 10:

$T_1$ shown in FIGS. 9 and 10 is the time at which the line corresponding to gradation level 128 is printed and a new line having gradation level 256 starts to be printed. Consequently, the printing time is decreased to one-half that for gradation level 256.

Figure 11:
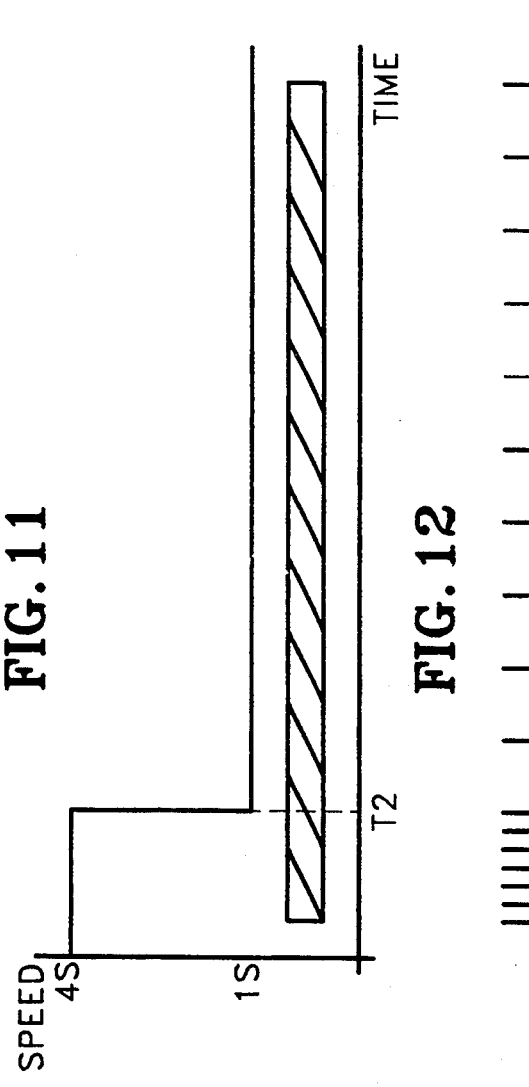
Figure 12:

Further, if the value detected from maximum data detector 101 is equal to "01000000" as shown in FIGS. 11 and 12, the maximum gradation level is 64. In this case, system controller 106 outputs the speed and direction control signals for the motors to servo controller 102, and drives drum motor 103 and reel motor 104 at a high speed of four times (4S) the normal speed. At this point, $T_2$ is the time at which a new line starts to be printed after a gradation level of 64 has been printed, whereat the printing time is decreased to one-quarter that for gradation level 256. Accordingly, as before, servo controller 102 drives the motors whose speed is varied in accordance with the maximum data detected from the maximum data detector 101.

On the other hand, system controller 106 reads the maximum gradation value of a line and prints until gradation counter 108 reaches the maximum value by comparing the present gradation value with the maximum value. Then, gradation counter 108 is initialized under the control of system controller 106 in order to print the following line.

Figure 13:
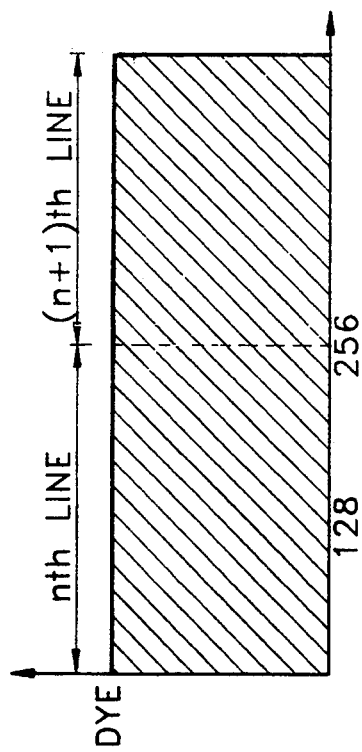
FIG. 13 shows a printing style in the case of 128 gradations of the high speed thermal printer shown in FIG. 6.

In summary, for the case of gradation level 128 as shown in FIG. 5, the conventional printer controls the motor to be driven in acceleration to the following line after gradation printing of one line is complete, which results in the dye being expressed only in the preceding section of one line. However, the high speed thermal printer according to the present invention, as shown in FIG. 13, controls the speed of the motors in accordance with the maximum gradation value so that, advantageously, the dye is uniformly spread throughout the line, whereby image degradation is prevented and the printing time can be decreased by the paper being positioned without transportation to the next printing position after the maximum gradation of a line has been printed.

As described above, the high speed thermal printer according to the present invention drives the drum motor and reel motor at a constant speed for the duration of a maximum gradation printing operation, and expresses the dye uniformly throughout the line on which dye is to be expressed, whereby high quality printing can be achieved and the printing time decreased by the paper being positioned on the following printing position without transportation to the next printing position after the maximum gradation of a line has been printed.

While the present invention has been shown and described with reference to particular embodiments thereof, it will be understood by those skilled in the art that various changes in form and details may be effected therein without departing from the spirit and scope of the invention as defined by the appended claims.

What is claimed is:

1. A high speed thermal printer for receiving and storing an image signal from a signal input source on a line-by-line basis, gradation-comparing the stored signal with a predetermined gradation value, and then printing on printing paper by sublimating dye contained in a film by a thermal print head comprising a plurality of heat generating elements, the printer comprising:
    detecting means for detecting maximum gradation data from the image signal of a line received from said signal input source on a line-by-line basis;
    servo means for transporting said printing paper and film having said dye thereon; and
    servo controlling means for controlling a printing speed of said thermal print head by varying a speed of said servo means from line to line in accordance with the maximum gradation data detected in each line by said detecting means.

2. The high speed thermal printer as claimed in claim 1, wherein said servo controlling means varies a speed of said servo means in inverse proportion to the maximum gradation data detected by said detecting means.

3. The high speed thermal printer as claimed in claim 2, wherein said servo controlling means controls said servo means to be driven at a constant speed for a duration of printing a corresponding line in accordance with the maximum gradation data.

4. A high speed thermal printer as recited in claim 1, wherein said servo controlling means controls said servo means to be driven at a constant speed for a duration of printing a corresponding line in accordance with the maximum gradation data.

5. A high speed thermal printer associated with a color video printer apparatus and comprising storing means for storing an image signal input from a signal input source on a frame-by-frame basis, image print controlling means for gradation-comparing the image signal with a predetermined gradation value on a line-by-line basis, and a thermal print head comprising a plurality of heat generating elements for printing on a printing paper by sublimating dye, said printer further comprising:
    a drum motor for transporting the printing paper;
    a reel motor for transporting a film on which the dye is coated;
    maximum data detecting means for receiving the image signal on a line-by-line basis and for detecting maximum printing gradation data from the image signal;
    motor driving means for simultaneously driving said drum motor and reel motor; and
    system controlling means for controlling said motor driving means to drive said drum and reel motors at a constant speed in accordance with the maximum printing gradation data detected by said maximum data detecting means.

6. The high speed thermal printer as claimed in claim 5, wherein said system controlling means outputs a driving control signal for varying a speed of said drum and reel motors in an inverse proportion to the maximum printing gradation data detected by said maximum data detecting means.

* * * * *